United States Patent
Nakamura et al.

(10) Patent No.: US 7,089,952 B2
(45) Date of Patent: Aug. 15, 2006

(54) FUEL PARTS AND PROCESS FOR PRODUCING THE SAME

(75) Inventors: Ken Nakamura, Yamaguchi (JP); Akio Miyamoto, Yamaguchi (JP); Keiichiro Koyashiki, Yamaguchi (JP); Taizo Murakami, Yamaguchi (JP); Takenobu Matsumura, Yamaguchi (JP); Yutaka Matsudomi, Yamaguchi (JP); Keitaro Ono, Yamaguchi (JP)

(73) Assignee: UBE Industries, Ltd., Yamaguchi (JP)

( * ) Notice: Subject to any disclaimer, the term of this patent is extended or adjusted under 35 U.S.C. 154(b) by 633 days.

(21) Appl. No.: 10/099,024

(22) Filed: Mar. 14, 2002

(65) Prior Publication Data

US 2003/0037831 A1 Feb. 27, 2003

(30) Foreign Application Priority Data

Mar. 16, 2001 (JP) .......................... P.2001-075264
Nov. 26, 2001 (JP) .......................... P.2001-358709

(51) Int. Cl.
*F17D 3/00* (2006.01)

(52) U.S. Cl. .................... 137/15.01; 137/375; 251/368
(58) Field of Classification Search ................ 251/368; 137/375, 15.01
See application file for complete search history.

(56) References Cited

U.S. PATENT DOCUMENTS

| | | | |
|---|---|---|---|
| 554,426 A | 2/1896 | Raymond | |
| 3,613,957 A | 10/1971 | Walles | |
| 4,217,935 A * | 8/1980 | Grendelman et al. | 138/109 |
| 4,233,367 A | 11/1980 | Ticknor et al. | |
| 4,879,341 A | 11/1989 | Tsumiyama et al. | |
| 5,086,105 A | 2/1992 | Abe et al. | |
| 5,154,979 A | 10/1992 | Kerschbaumer et al. | |
| 5,404,907 A | 4/1995 | Benjey et al. | |
| 5,443,098 A | 8/1995 | Kertesz | |
| 5,475,049 A | 12/1995 | Ohtomo et al. | |
| 5,500,263 A | 3/1996 | Röber et al. | |
| 5,850,855 A | 12/1998 | Kerschbaumer et al. | |
| 2001/0018485 A1 * | 8/2001 | Matsuoka et al. | 524/492 |

FOREIGN PATENT DOCUMENTS

| | | |
|---|---|---|
| DE | 42 39 909 C1 | 5/1994 |
| DE | 195 35 413 C1 | 10/1996 |
| DE | 195 33 920 A1 | 3/1997 |
| DE | 195 43 318 A1 | 5/1997 |
| DE | 196 21 309 A1 | 12/1997 |
| DE | 197 20 317 A1 | 11/1998 |
| DE | 198 21 719 C2 | 7/2001 |
| EP | 0 015 556 A1 | 9/1980 |
| EP | 0 101 207 B1 | 4/1987 |
| EP | 0 352 042 A1 | 1/1990 |
| EP | 0 358 415 A1 | 3/1990 |
| EP | 0 673 762 A2 | 1/1995 |

(Continued)

OTHER PUBLICATIONS

Saechtling, Kunststoff-Taschenbuch, Ausgabe, Hanser-Verlag, pp. 338-341, (1992).

(Continued)

*Primary Examiner*—A. Michael Chambers
(74) *Attorney, Agent, or Firm*—Akin Gump Strauss Hauer & Feld, LLP

(57) ABSTRACT

Described are fuel parts comprising a crystalline polyamide resin having a terminal amino group concentration>a terminal carboxyl group concentration and excellent in fuel resistance at their weld portion, which fuel parts are suited for use as various parts to be attached to fuel tanks of automobiles and the like, and a process for producing the fuel parts.

20 Claims, 4 Drawing Sheets

FOREIGN PATENT DOCUMENTS

| | | |
|---|---|---|
| EP | 0 461 836 B1 | 9/1995 |
| EP | 0 754 898 B1 | 5/1998 |
| EP | 0 947 368 A2 | 3/1999 |
| EP | 1 044 806 A2 | 10/2000 |
| EP | 1 170 334 A2 | 1/2002 |
| FR | 2 614 967 A1 | 11/1988 |
| FR | 2 776 228 A1 | 9/1999 |
| GB | 1 335 791 | 10/1973 |
| JP | 46-23914 | 7/1971 |
| JP | 55-49989 B2 | 12/1980 |
| JP | 60-14695 B2 | 4/1985 |
| JP | 62000548 | 1/1987 |
| JP | 64-056751 | 3/1989 |
| JP | 05-293916 | 11/1993 |
| JP | 09189380 A | 7/1997 |
| JP | 2715870 B2 | 11/1997 |
| WO | WO 97/08222 A1 | 3/1997 |
| WO | WO 00/43230 A1 | 7/2000 |

OTHER PUBLICATIONS

Römpp, Chemie Lexikon, 9. Auflage, Georg Thieme Verlag, Germany, pp. 930-931, (1990).
Römpp, Chemie Lexikon, 9. Auflage, Georg Thieme Verlag, Germany, pp. 2428-2429, (1990).
Saechtling, Kunststoff-Taschenbuch, 25. Ausgabe, Hanser-Verlag, pp. 244-245, (1992).
Römpp, Chemie Lexikon, 9. Auflage, Georg Thieme Verlag, Germany, pp. 3530-3531, (1990).
Gottfried W. Ehrenstein, Polymer-Werkstoffe, 2. Auflage, Hanser Verlag, Munich, pp. 134-135, (1999).
Raw Material Specification Technische Zeichnung 2036 0100 175 "Kunststoff-Granulate" (Plastic granulate), (Sep. 1999).
Technische Zeichnung ENG 00 181 B (technical drawing).
Technische Zeichnung ENG 00 182 B.
Technische Zeichnung ENG 00 183 B.
Order from Kautex Textron for "2-K connectors" (Oct. 1999).
Abnahmeprüfzeugnis 10114592, erstellt von EMS-Grivory (Acceptance certificate of EMS).
Melvin I. Kohan, "Nylon Plastics Handbook", pp. 430-431—Carl Hanser Verlag, Munich (1995).
Harry S. Katz, "Handbook of Fillers and Reinforcements for Plastics", Van Nostrand Reinhold Company, New York, pp. 160-171, (1978).
Norman G. Gaylord, "Compatibilizing Agents: Structure and Function in Polyblends", *J. Marcomol. Sci.-Chem.*, vol. A26, No. 8, pp. 1211-1229, (1989).
EMS—Chemie AG, Technical Bulletin, "Grilamid LV-3AH Natur, Polymer 2K 5434 Natur", pp. 1-5, (Dec. 1998).
EMS—Chemie AG, Idea Sheet "Projekt Grilamid LV-3AH ESD", (Jul. 2000).
EMS—Chemie Report, "FEM-Bauteilanalyse eines 2K-Stutzens fur die Firmen Rasmussen/Kautex Textron", (Jun. 2000).
Visitor Report of Mr. Harald Sauer, (EMS-Chemie AG) to Rasmussen GmbH (Jul. 1999).
Visitor Report of Mr. Harald Sauer, (EMS-Chemie AG) to Rasmussen GmbH (Nov. 1999).
EMS—Chemie GmbH letter to Rasmussen GmbH (Dec. 1999).
Visitor Report of Mr. Harald Sauer, (EMS-Chemie AG) to Rasmussen GmbH (Dec. 1999).
Visitor Report of Mr. Harald Sauer, (EMS-Chemie AG) to Rasmussen GmbH (Dec. 2000).
EMS—Chemie AG, Quality Control Results for Termical Group Numbers in Polyamide Polymer L22A (2000).
Tnp Report of Dr. G. Stoppelmann (EMS-Chemie) to Besuchsbericht Kautex-Textron/Rasmussen (Sep. 1998).
Visitor Report of Mr. H. Yoshida (EMS-Chemie Japan) to Piolax (Aug. 1999).
EMS—Chemie AG-Lecture "Polymer Nanocomposites", pp. 1-21, (Sep. 2000).

\* cited by examiner

FRONT VIEW   SIDE VIEW

US 7,089,952 B2

FUEL PARTS AND PROCESS FOR PRODUCING THE SAME

FIELD OF THE INVENTION

The present invention relates to fuel parts excellent in fuel resistance at the weld portion thereof and a production process of the parts. More specifically, the invention pertains to fuel parts excellent in fuel permeation resistance and also excellent in fuel resistance at the weld portion over long years; and a production process of the parts.

BACKGROUND OF THE INVENTION

For safety and environment protection, there has conventionally been a demand for reducing an amount of a fuel evaporated from the wall or connection of a fuel tank or attachments thereto. In the automobile industry, for example, a resin fuel tank having a single layer structure and being made of high-density polyethylene (which may be called "HDPE resin") by the blowing method is in widespread use as a fuel tank body for automobiles. In the case of a resin fuel tank, various methods have been developed in order to reduce a permeation amount of a fuel from the tank body, for example, a method of sulfonating the resin ($SO_3$ treatment, Japanese Patent Publication No. 23914/1971), a method of treating with fluorine ($F_2$ treatment), a method of producing a blow molding having a multilayer structure with a barrier resin (Japanese Patent Publication No. 49989/1980) and a method of dispersing, in the form of flakes, a barrier resin such as polyamide in a continuous matrix phase of polyethylene (Japanese Patent Publication No. 14695/1985).

In particular, a resin fuel tank of a multilayer structure having an HDPE resin layer formed as the outer layer of the fuel tank and at the same time, having, on the inside of the fuel tank, an inner layer made of a polyamide resin or ethylene/vinyl alcohol copolymer excellent in barrier properties against a fuel gas has come to be popular recently.

Even if a permeation amount of a fuel from a fuel tank body is reduced by the above-described method, permeation from various parts (ex. valves) attached to the fuel tank cannot be negligible and becomes an obstacle to reduction in the total evaporation amount from the fuel parts.

Although various parts attached to a fuel tank are, in order to attain sufficient adhesion strength with the fuel tank, made of high-density polyethylene similar to the fuel tank, this high-density polyethylene is inferior in fuel permeation resistance.

It was therefore investigated to produce various parts for a fuel tank by using a polyamide resin excellent in fuel permeation resistance. If so, however, inferior adhesion between polyethylene and polyamide caused such a problem as insufficient adhesion strength with the fuel tank.

Production of a fuel part having a multilayer structure made of a polyethylene layer, an adhesive layer and a polyamide layer was investigated, but it was accompanied with the problem that when the part was brought in contact with gasoline or gasohol, swelling of the polyethylene layer and adhesive layer occurs and it induces lowering in interlayer adhesion strength between the polyethylene layer and polyamide layer, leading to generation of interlayer peeling or cracks.

In Japanese Patent No. 2715870, described is use of a glass-fiber-reinforced polyamide resin for a part of a polyethylene joint for joining a flexible conduit to a polyethylene tank for the purpose of preventing fuel leakage due to creep of polyethylene at the connection of a tube such as coupler.

In general, it has been regarded that polyamide resins have low gasoline permeability, are almost free from swelling when in contact with gasoline and hardly cause lowering in physical properties or dimensional change. In recent years, however, gasohol, that is, gasoline mixed with 10 to 15 wt. % of methanol or ethanol based on the total amount of the mixture has frequently been used. In a direct fuel-injection engine, fuel temperature in the tank increases even to 60 to 80° C. due to some return of the fuel. It has been found that the polyamide swells with methanol or ethanol in gasohol at such high using temperatures and in particular, an elastic modulus in a direction perpendicular to the orientation reinforcing direction of glass fibers shows a marked decrease, leading to a creeping phenomenon.

This suggests that not only a simple substance of polyamide but also fiber-reinforced polyamide cannot be used for a structural member in contact with a gasohol fuel.

SUMMARY OF THE INVENTION

An object of the present invention is therefore to overcome the above-described problems and to provide a fuel part excellent in fuel permeation resistance and at the same time, excellent in fuel resistance at the weld portion of the fuel part, particularly in fuel resistance at the weld portion over long hours; and a production process thereof.

Another object of the present invention is to provide a fuel part which is capable of suppressing evaporation of a fuel from the fuel part (for example, a valve cover attached to a polyethylene fuel tank), is weldable easily to the polyethylene fuel tank, is capable of maintaining excellent interlayer adhesion even after contact with gasoline or gasohol, and has excellent creep resistance.

With a view toward overcoming the above-described problems, the present inventors have carried out an extensive investigation. As a result, it has been found that the objects can be attained using a crystalline polyamide resin having a terminal amino group concentration>a terminal carboxyl group concentration, leading to the completion of the invention.

In one aspect of the present invention, there is thus provided a fuel part excellent in fuel resistance at the weld portion thereof which comprises a crystalline polyamide resin having a terminal amino group concentration>a terminal carboxyl group concentration.

In another aspect of the present invention, there is also provided a fuel part excellent in fuel resistance at the weld portion thereof, which fuel part is obtained by welding a crystalline polyamide resin having a terminal amino group concentration>a terminal carboxyl group concentration and a polyolefin resin modified with an unsaturated carboxylic acid or derivative thereof.

DETAILED DESCRIPTION OF THE INVENTION

Figure 1:
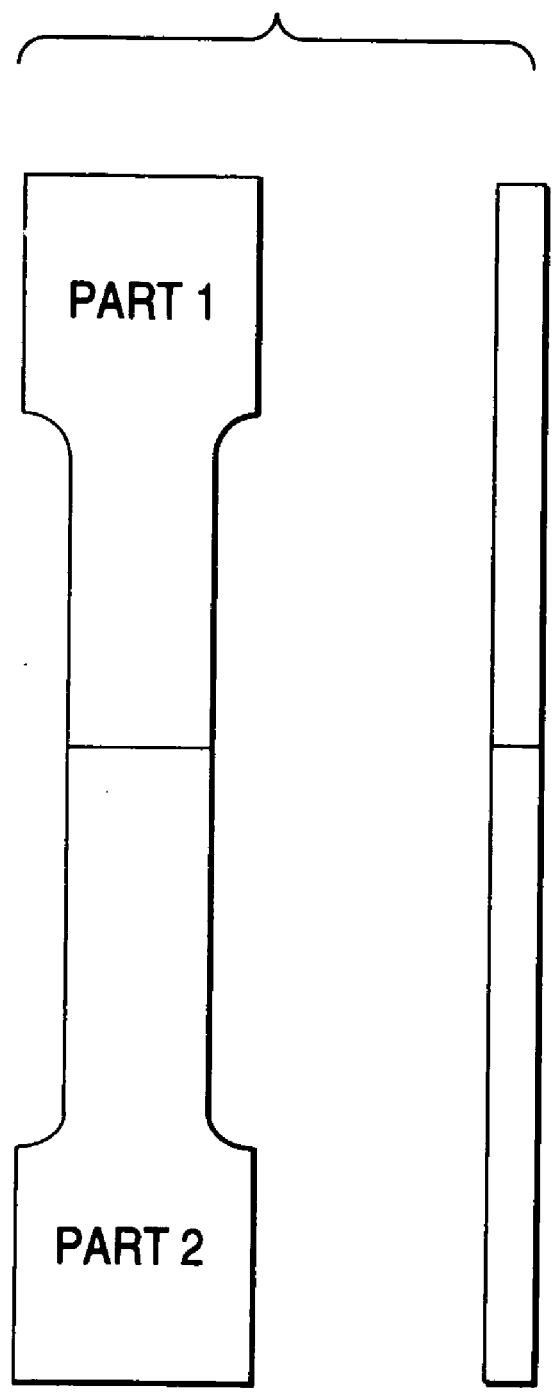
FIG. 1 illustrates the shape of a test piece for evaluation of adhesion strength used in Example 1 of the invention.

The invention will next be described more specifically.

The phrase "a terminal amino group concentration>a terminal carboxyl group concentration" as used herein means "a terminal amino group concentration greater than a terminal carboxyl group concentration".

The crystalline polyamide resin of the invention has a terminal amino group concentration greater than a terminal carboxyl group concentration. The terminal amino group concentration is preferably 50 milliequivalent or greater, more preferably 60 milliequivalent or greater, per kg of a polymer. When the crystalline polyamide resin is welded with a polyolefin resin modified with an unsaturated carboxylic anhydride, excessive terminal amino group concentrations make the welding strength excellent and permit exhibition of excellent fuel resistance.

The crystalline polyamide resin of the invention is preferably an aliphatic polyamide resin made of a combination of an aliphatic diamine and an aliphatic dicarboxylic acid, a lactam, or an aminocarboxylic acid.

Examples of the monomer component of the aliphatic polyamide resin include $C_{4-12}$ aliphatic diamines and $C_{6-12}$ aliphatic dicarboxylic acids, $C_{6-12}$ lactams, and $C_{6-12}$ aminocarboxylic acids.

Specific examples of the aliphatic diamines include tetramethylenediamine, hexamethylenediamine, octamethylenediamine, nonamethylenediamine, undecamethylenediamine and dodecamethylenediamine. Specific examples of the aliphatic dicarboxylic acids include adipic acid, heptanedicarboxylic acid, octanedicarboxylic acid, nonanedicarboxylic acid, undecanedicarboxylic acid and dodecanedicarboxylic acid. An equimolar salt of hexamethylenediamine and adipic acid is a preferred combination example of the aliphatic diamine and aliphatic dicarboxylic acid.

Specific examples of the lactam include α-pyrrolidone, ε-caprolactam, ω-laurolactam, ε-enantholactam. Specific examples of the aminocarboxylic acid include 6-aminocaproic acid, 7-aminoheptanoic acid, 11-aminoundecanoic acid and 12-aminododecanoic acid. Of these, 6-aminocaproic acid, 12-aminododecanoic acid, ε-caprolactam and laurolactam are preferred.

These aliphatic polyamide forming monomers may be used either singly or in combination of at least two components as a mixture.

Specific examples of the aliphatic polyamide resin formed of such a monomer component include nylon 6, nylon 66, nylon 11 and nylon 12. They may be either a homopolymer or a copolymer of at least two monomer components. Of these, nylon 6 and nylon 66 having the lowest gasoline permeability are most preferred.

As the crystalline polyamide resin of the invention, crystalline semi-aromatic polyamide resins containing at least one aromatic monomer component are preferred.

Examples of the crystalline semi-aromatic polyamide resin containing at least one aromatic monomer component include copolyamide resins containing at least one aromatic monomer component such as an aromatic dicarboxylic acid component, for example, terephthalic acid, isophthalic acid or naphthalenedicarboxylic acid. Preferred are crystalline semi-aromatic copolyamide resins containing at least one aromatic monomer component and having a melting point of 260° C. or greater but less than 320° C., with crystalline semi-aromatic copolyamide resins containing at least one aromatic monomer component and having a melting point of 290° C. or greater but less than 316° C. being more preferred.

The crystalline semi-aromatic copolyamide resins containing at least one aromatic monomer component are preferably crystalline copolyamide resins made of an equimolar salt of an aliphatic diamine and an aliphatic dicarboxylic acid; an equimolar salt of an aliphatic diamine and an aromatic dicarboxylic acid, and/or an aliphatic polyamide forming monomer.

The term "aliphatic diamine" as used herein means a $C_{4-12}$ aliphatic diamine. Examples include tetramethylenediamine, hexamethylenediamine, octamethylenediamine, nonamethylenediamine, undecamethylenediamine and dodecamethylenediamine.

The term "aliphatic dicarboxylic acid" as used herein means a $C_{6-12}$ aliphatic dicarboxylic acid. Examples include adipic acid, heptanedicarboxylic acid, octanedicarboxylic acid, nonanedicarboxylic acid, undecanedicarboxylic acid and dodecanedicarboxylic acid.

The preferred combination is an equimolar salt of hexamethylenediamine and adipic acid.

Examples of the aromatic dicarboxylic acid include terephthalic acid, isophthalic acid and naphthalenedicarboxylic acid. The preferred combination is an equimolar salt of hexamethylenediamine and terephthalic acid.

As the aliphatic polyamide forming monomer, usable are $C_{6-12}$ aminocarboxylic acids and $C_{6-12}$ lactams. Specific examples include 6-aminocaproic acid, 7-aminoheptanoic acid, 11-aminoundecanoic acid, 12-aminododecanoic acid, α-pyrrolidone, ε-caprolactam, laurolactam and ε-enantholactam, of which 6-aminocaproic acid, 12-aminododecanoic acid, ε-caprolactam and laurolactam are preferred. These aliphatic polyamide forming monomers may be used either singly or in combination of at least two components as a mixture.

The crystalline copolyamide resins each contains 30 to 70 wt. %, based on the amount of the crystalline copolyamide resin, of an equimolar salt of hexamethylenediamine and adipic acid, 70 to 30 wt. %, based on the amount of the crystalline copolyamide resin, of an equimolar salt of hexamethylenediamine and terephthalic acid and 0 to 15 wt. %, based on the amount of the crystalline copolyamide resin, of the aliphatic polyamide forming monomer, more preferably 35 to 55 wt. %, based on the amount of the crystalline copolyamide resin, of an equimolar salt of hexamethylenediamine and adipic acid, 65 to 45 wt. %, based on the amount of the crystalline copolyamide resin, of an equimolar salt of hexamethylenediamine and terephthalic acid and 0 to 10 wt. %, based on the amount of the crystalline copolyamide resin, of the aliphatic polyamide forming monomer.

Although no particular limitation is imposed on the polymerization degree of the crystalline polyamide resin of the invention, the relative viscosity, as measured at 25° C., of 1 g of the polymer dissolved in 100 ml of 96% concentrated sulfuric acid is preferably 1.8 to 5.0, more preferably 2.0 to 3.0. Relative viscosities exceeding the upper limit of the above-described range markedly impair processability, while those less than the lower limit deteriorate mechanical strength. Relative viscosities outside the above range are therefore not preferred.

Although no particular limitation is imposed on the preparation process of the polyamide resin having a terminal amino group concentration greater than a terminal carboxyl group concentration, it can be prepared by incorporating, upon polymerization or extrusion kneading of the composition after polymerization, a diamine compound in the composition. In the case of preparation upon melt polymerization, usable is a method of adding an excess of a diamine monomer upon charging of raw materials and effecting polymerization, a method of adding raw material monomers and a diamine compound other than raw material monomers upon charging of raw materials and effecting polymerization, and a method of preparing a polyamide having a predetermined molecular weight by polymerization and then adding a diamine compound, rightly before taking out the polymer from the polymerization tank, so as to adjust the target terminal group concentration balance. In the case of preparation after polymerization, the polyamide resin obtained by polymerization and a diamine compound are kneaded under a molten state so as to adjust the target terminal group concentration balance.

Specific examples of the diamine compound include, in addition to the above-exemplified monomers for a polyamide resin, aliphatic diamines such as methylenediamine, ethylenediamine and trimethylenediamine and aromatic diamines such as naphthalenediamine and m-xylylenediamine. Of these, hexamethylenediamine, dodecamethylenediamine and m-xylylenediamine are preferred.

The polyamide resin of the invention may contain a layered silicate. Examples of the layered silicate include layered phyllosilicate formed of magnesium silicate or aluminum silicate layers.

Specific examples of the layered phyllosilicate include smectite clay minerals such as montmorillonite, saponite, beidellite, nontronite, hectorite and stevensite, vermiculite and hallosite. They may be either natural products or synthesized ones. Of these, montmorillonite is preferred.

The layered silicate dispersed uniformly in a polyamide resin is desired. The term "layered silicate dispersed uniformly in a polyamide resin" means that layers of the layered silicate having a side length of 0.002 to 1 μm and thickness of 6 to 20 Å are uniformly dispersed in a polyamide resin while maintaining a layer-layer distance of 20 Å or greater on average. The term "layer-layer distance" means a distance between gravity centers of the adjacent plates in layered silicate, while the term "uniformly dispersed" means that at least 50 wt. %, more preferably, at least 70 wt. % of the plates in layered silicate, based on the total amount of layered silicate, are, as a laminate of 5 or less layers on average, dispersed in parallel and/or at random without locally forming a block.

The layered silicate is added in an amount of 0.05 to 10 parts by weight, especially 1.5 to 5 parts by weight, based on 100 parts by weight of the polyamide resin. Amounts of the layered silicate less than 0.05 part by weight do not bring about sufficient effects for controlling fuel permeation, while those exceeding 10 parts by weight induce a deterioration in physical properties, particularly, impact strength, of the polymer. Amounts outside the range are therefore not preferred.

When the layered silicate is a multilayer clay mineral, it may be uniformly dispersed by, prior to polymerization, bringing it in contact with a swelling agent, for example, amine such as dioctadecylamine or phenylenediamine, amino acid such as 4-amino-n-butyric acid or 12-aminododecanoic acid or lactam such as ε-caprolactam to widen the distance between layers in advance, thereby facilitating insertion of a monomer between the layers. It is also possible to uniformly disperse the layered silicate by widening the distance between layers to 20 Å or greater by using a swelling agent and then mixing it with a polyamide resin under a molten state.

The polyamide resin of the invention is usable as a fuel part as is, but it may contain a function imparting agent such as heat resistance imparting agent, weather resistance imparting agent, nucleating agent, crystallization accelerator, mold release agent, lubricant, antistatic, flame retardant, flame-retarding assistant or colorant within an extent not impairing the object of the invention.

Specific examples of the heat resistance imparting agent include hindered phenols, phosphites, thioethers and copper halides. They may be used either singly or in combination.

Examples of the weather resistance imparting agent include hindered amines and salicylates. They may be used either singly or in combination.

Examples of the nucleating agent include inorganic fillers such as clay and organic nucleating agents such as fatty acid metal salts. They may be used either singly or in combination.

Examples of the crystallization accelerating agent include low-molecular-weight polyamides, higher fatty acids, higher fatty acid esters and higher aliphatic alcohols. They may be used either singly or in combination.

Examples of the mold release agent include fatty acid metal salts, fatty acid amides and various waxes. They may be used either singly or in combination.

Examples of the antistatic include aliphatic alcohols, aliphatic alcohol esters and higher fatty acid esters. They may be used either singly or in combination.

Examples of the flame retardant include metal hydroxides such as magnesium hydroxide, phosphorus, ammonium phosphate, poly(ammonium phosphate), melamine cyanurate, ethylene dimelamine dicyanurate, potassium nitrate, brominated epoxy compounds, brominated polycarbonate compounds, brominated polystyrene compounds, tetrabromobenzyl polyacrylate, tribromophenol polycondensates, polybromobiphenyl ethers and chlorine series flame retardants. They may be used either singly or in combination.

Of these, addition of a moldability or formability improver such as mold release agent, lubricant or nucleating agent is preferred.

To the polyamide resin of the invention, another thermoplastic resin can be added within an extent not impairing the objects of the invention. Examples of the thermoplastic resin usable in combination include general-purpose resin materials such as polyethylene, polypropylene, polystyrene, ABS resins, AS resins and acrylic resins and highly heat-resistant resins such as polycarbonate, polyphenylene oxide, polyethylene terephthalate, polybutylene terephthalate and polyphenylene sulfide. Particularly when polyethylene or polypropylene is used in combination, use of that modified with maleic anhydride or glycidyl-containing monomer is desired.

A fuel part made of the crystalline polyamide resin of the invention having a terminal amino group concentration>a terminal carboxyl group concentration is bonded to a fuel tank with a polyolefin resin, which has been modified with an unsaturated carboxylic acid or derivative thereof, as an intermediate adhesion layer. Described specifically, the crystalline polyamide resin having a terminal amino group concentration>a terminal carboxyl group concentration is welded with a polyolefin resin modified with an unsaturated carboxylic acid or derivative thereof and then, the resulting part is joined to a fuel tank.

Examples of the polyolefin resin modified with an unsaturated carboxylic acid or derivative thereof include polymers obtained by graft polymerization of an unsaturated carboxylic acid or derivative thereof on polyethylene, an ethylene.α-olefin series copolymer, an ethylene.α,β-unsaturated carboxylic acid ester series copolymer or a partially-saponified ethylene-vinyl acetate series copolymer.

The "ethylene.α-olefin series copolymer" is a polymer obtained by copolymerization of ethylene with an α-olefin having at least 3 carbon atoms. Examples of the α-olefin having at least 3 carbon atoms include propylene, butene-1, hexene-1, decene-1,4-methylbutene-1, and 4-methylpentene-1, of which propylene and butene-1 are preferred.

The ethylene.α,β-unsaturated carboxylic acid ester series copolymer is a polymer obtained by copolymerization of ethylene and an α,β-unsaturated carboxylic acid ester monomer. Examples of the α,β-unsaturated carboxylic acid ester monomer include acrylic acid esters such as methyl acrylate, ethyl acrylate, propyl acrylate and butyl acrylate, and methacrylic acid esters such as methyl methacrylate, ethyl methacrylate, propyl methacrylate and butyl methacrylate. Of these, ethylene.ethyl acrylate copolymer and ethylene.methyl methacrylate copolymer are preferred for their availability at a low cost and excellent heat stability.

The partially-saponified ethylene.vinyl acetate series copolymer is a partially saponified compound of an ethylene.vinyl acetate copolymer. This partially-saponified ethylene.vinyl acetate copolymer is available by saponifying an ethylene.vinyl acetate copolymer in a known manner, for example, treatment in a system made of a low-boiling point alcohol such as methanol or ethanol and an alkali such as sodium hydroxide, potassium hydroxide or sodium methylate.

Examples of the unsaturated carboxylic acid or derivative thereof to be graft polymerized include unsaturated carboxylic acids such as acrylic acid, methacrylic acid, ethacrylic acid, maleic acid, fumaric acid, itaconic acid, citraconic acid and nadic acid; and derivatives thereof such as acid halides, amides, imides, anhydrides and esters. Specific examples of the derivative include maleyl chloride, maleimide, maleic anhydride, monomethyl maleate and dimethyl maleate. Of these, unsaturated dicarboxylic acids and anhydrides thereof are preferred, with maleic acid and nadic acid, and anhydrides thereof being especially preferred.

The modified polyolefin resin can be prepared in a known manner, for example, by reacting an unmodified polyolefin resin with an unsaturated carboxylic acid under a molten state, in a solution state, in a slurry state or in a gaseous phase.

The welding of the crystalline polyamide resin having a terminal amino group concentration>a terminal carboxyl group concentration with the polyolefin resin modified with an unsaturated carboxylic acid or derivative thereof is carried out by molding or forming the polyolefin resin modified with an unsaturated carboxylic acid or derivative thereof, injection molding the crystalline polyamide resin having a terminal amino group concentration>a terminal carboxyl group concentration and then, welding the resulting molded or formed products.

Specific examples of the welding method include vibration welding, injection welding such as die slide injection (DSI), die rotary injection (DRI) and two-color injection molding, ultrasonic welding, spin welding, hot plate welding, hot wire welding, laser welding and welding by high-frequency induction heating.

The temperature of the molded or formed resin upon welding by injection welding such as DSI, DRI or two-color injection molding is preferably 250 to 320° C., more preferably 270 to 300° C. The mold temperature at this time is preferably 30 to 120° C., more preferably 50 to 100° C.

Examples of the fuel part of the invention include valves attached to a fuel tank, joints for fuel hose, canister connecting nozzles and separators.

An application example of the invention to a resin valve cover will next be described.

The resin valve cover is welded to the outer layer of a resin fuel tank, thereby sealing a valve-mounting slot formed on the fuel tank. The resin valve cover has a cylindrical shape having one end closed except for a pipe hole for delivering a fuel. The inside portion of the cylinder to be brought into contact with a fuel when the cover is welded to the fuel tank is made of a first resin, while the outside portion of the cylinder not brought into contact with the fuel is made of a second resin.

Figure 2:
FIG. 2 illustrates an application example of the fuel part of the invention to a resin valve cover.
Figure 2:
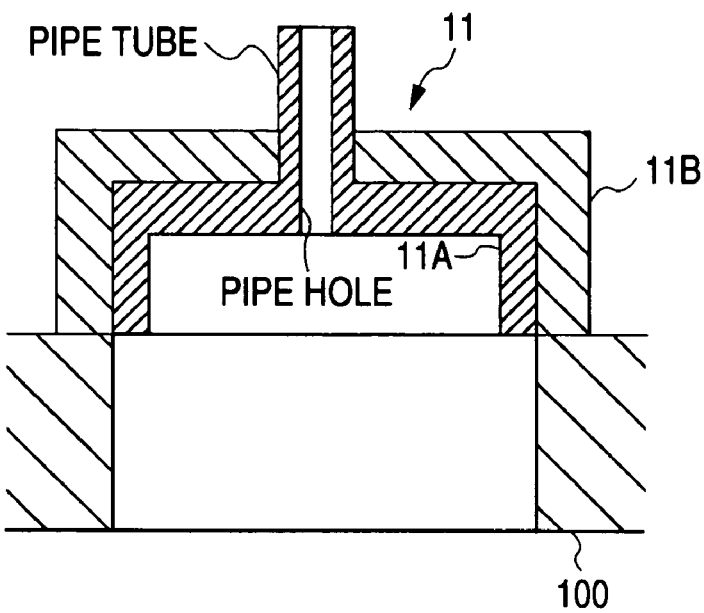

FIG. 2 illustrates an example of the above-described resin valve cover wherein a polyamide resin having a small fuel permeability is used as the first resin and a modified polyethylene resin having weldability to the outer layer of the fuel tank is used as the second resin, when the outer layer of the fuel tank is made of high-density polyethylene.

Figure 3:
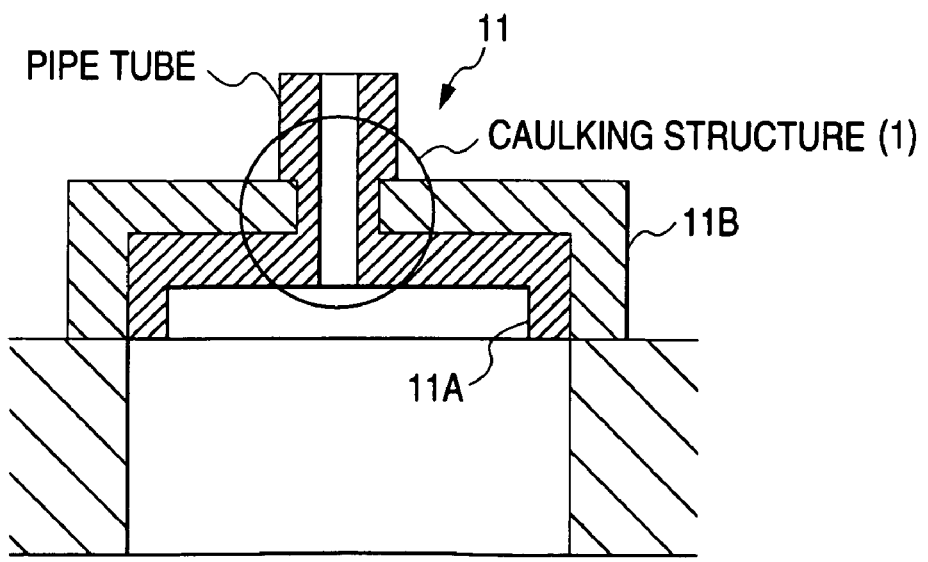
FIG. 3 illustrates another application example of the fuel part of the invention to a resin valve cover.

FIG. 3 illustrates an example of the above-described resin valve cover equipped with a pipe tube having a hollow hole communicated to the pipe hole. The pipe tube is made of the first resin and has, in the vicinity of its root, a cyclic concave to be brought into engagement with the second resin.

Figure 4:
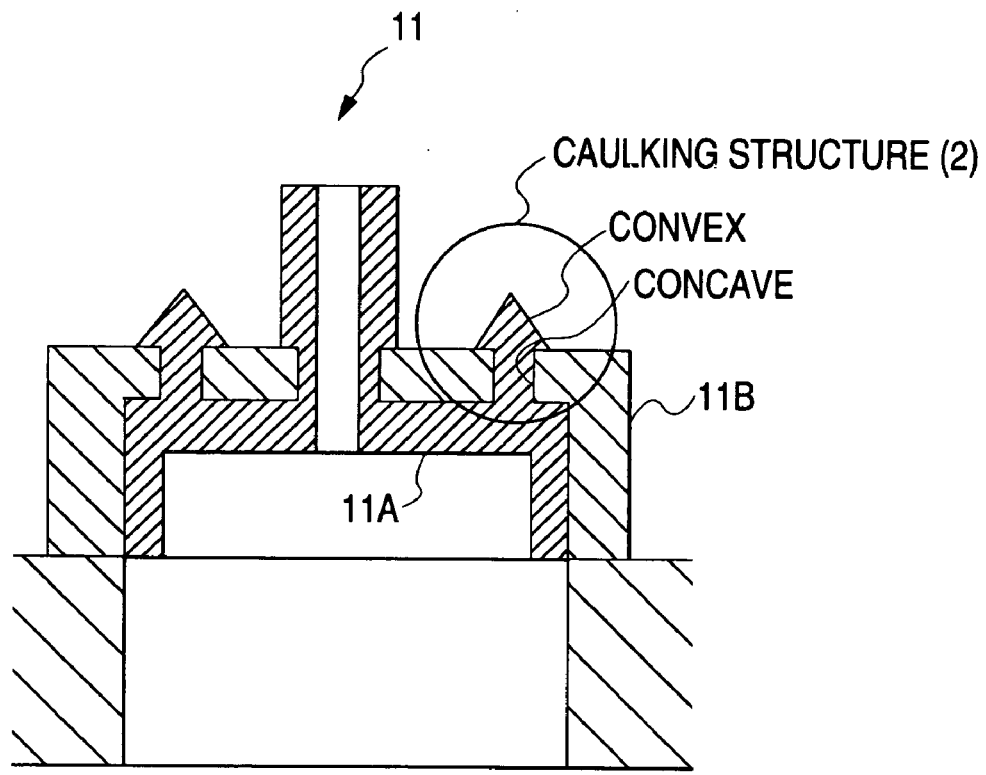
FIG. 4 illustrates a still another application example of the fuel part of the invention to a resin valve cover.

FIG. 4 illustrates an example of the above-described resin valve cover having a plurality of convexes or holes formed on the a member made of the first resin and at the same time having holes or convexes, to be fitted in the plurality of convexes or holes, formed on the member made of the second resin.

Figure 5:
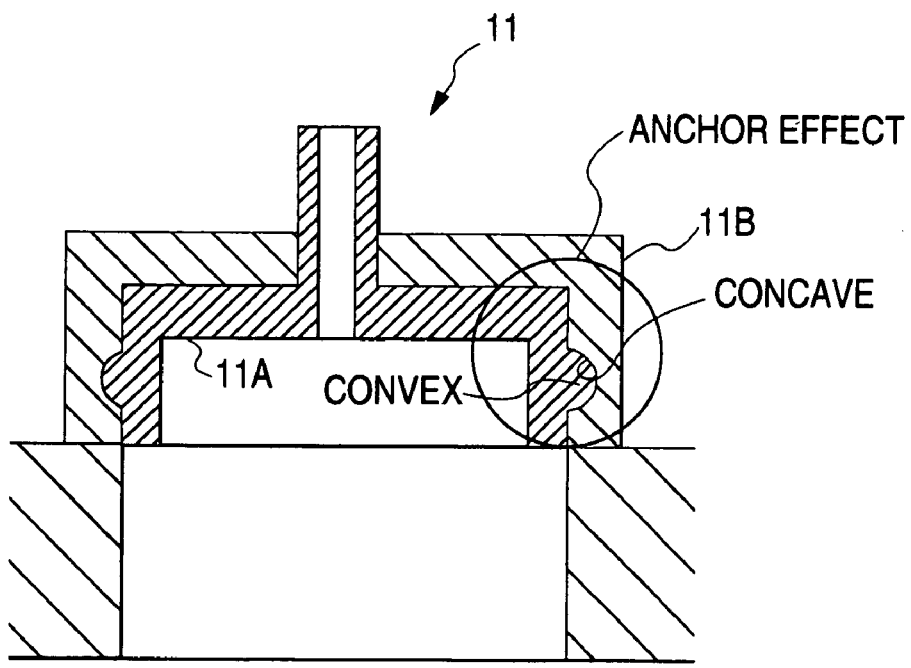
FIG. 5 illustrates a further application example of the fuel part of the invention to a resin valve cover.

FIG. 5 illustrates an example of the above-described resin valve cover having a plurality of convexes or concaves on a member made of the first resin and at the same time, having concaves or convexes, to be fitted in the plurality of convexes or concaves, formed on a member made of the second resin.

The resin valve covers according to the embodiments illustrated in FIGS. 3 to 5 have excellent effects for firmly integrating the member made of the first resin with the member made of the second resin while heightening their bonding strength.

Figure 6:
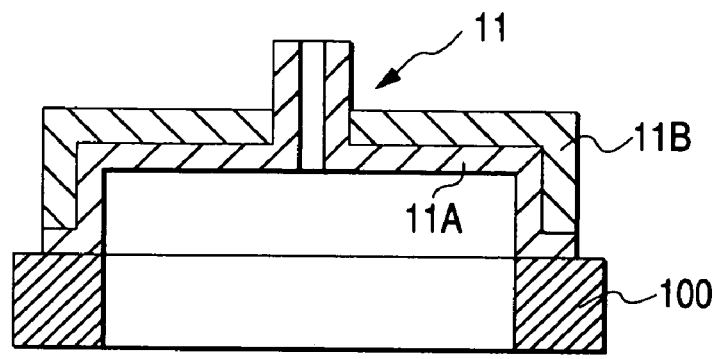
FIG. 6 illustrates a still further application example of the fuel part of the invention to a resin valve cover.

In the resin valve cover described above, a polyamide resin is used as the first resin, while a modified polyethylene resin is used as the second resin. On the contrary, it is possible to use a modified polyethylene resin as the first resin and a polyamide resin as the second resin. In this case, as illustrated in FIG. 6, the member made of the modified polyethylene resin serving as the first resin may be welded to the outer layer of the fuel tank.

In the invention, the polyamide resin may contain 3 to 27 wt. % of a plate-crystal inorganic filler based on the total amount of the polyamide resin and the plate-crystal inorganic filler. As the plate-crystal inorganic filler, fine talc powder or fine mica powder is preferred, with that having an average particle size of 0.5 to 10 μm and an aspect ratio (that is, a diameter/thickness ratio of the plate) of 5 or greater being especially preferred.

The content of the plate-crystal inorganic filler is 3 to 27 wt. %, preferably 15 to 25 wt. % based on the total amount of the polyamide resin and the plate-crystal inorganic filler. At contents less than 3 wt. %, T-peel strength improving effects are not available. At contents exceeding 27 wt. %, on the other hand, the polyamide layer becomes fragile and cohesion failure of the polyamide layer occurs in spite of a large interfacial weld strength. Thus, the contents within the above-described range are preferred.

Given as one embodiment of this case is a multilayer fuel part having the inner layer (A) to be brought in contact with a fuel and the outer layer (C) to be brought in contact with outside air, each made of modified high-density polyethylene available by grafting an unsaturated carboxylic acid or derivative thereof; and the intermediate layer (B) made of a polyamide containing 3 to 27 wt. % of a plate-crystal inorganic filler based on the total amount of the polyamide and the plate-crystal inorganic filler.

It may be a multilayer fuel part having the inner layer (A) made of modified high-density polyethylene available by grafting an unsaturated carboxylic acid or derivative thereof, and the outer layer (B) made of a polyamide having a terminal amino group concentration>a terminal carboxyl group concentration and containing 3 to 27 wt. % of a plate-crystal inorganic filler based on the total amount of the polyamide and the plate-crystal inorganic filler.

Figure 7:
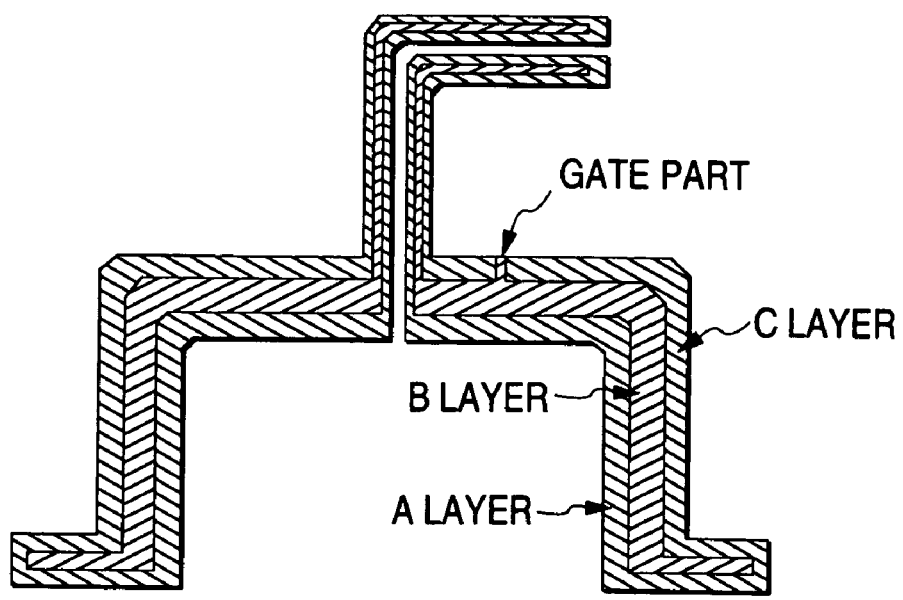
FIG. 7 illustrates a yet another application example of the fuel part of the invention to a resin valve cover.

The specific example of the former fuel part is shown in FIG. 7. This valve cover is for binding a fluid tube to a resin fuel tank and it has a pipe-like site for bonding to the fluid tube and a welding end for welding to the fuel tank.

This resin valve cover is welded to a polyethylene fuel tank of automobiles using gasoline or gasohol, making it possible to permanently bond a flexible fluid tube to the tank without leakage or cracks. This resin valve cover is, in addition, low in fuel evaporation and has excellent creep resistance.

The inner layer (A) and the outer layer (C) are each made of modified high-density polyethylene available by grafting an unsaturated carboxylic acid or derivative thereof on high-density polyethylene. The density of the modified high-density polyethylene is preferably 0.935 to 0.955 g/cm$^3$.

Use of the modified high-density polyethylene as the inner layer (A) to be brought into direct contact with gasoline makes it possible to weld the fuel part to a multi-layer fuel tank made of high-density polyethylene and effectively block alcohol series fuels such as methanol. When the modified high-density polyethylene is employed as the outer layer (C) to be exposed to the outside air, the resulting fuel part is excellent in resistance against calcium chloride. The fuel part is formed to have a multilayer structure having, as the intermediate layer (B) sandwiched between these layers, a layer made of a polyamide in which the plate-crystal inorganic filler has been incorporated, because the polyamide inevitably swells by the contact with an alcohol series fuel such as methanol when used at a high temperature, resulting in progress of interfacial peeling due to a dimensional change caused by a large difference in the swelling ratio between the polyamide and the modified high-density polyethylene due to the fuel. By forming a multilayer structure with the polyamide layer inserted between the polyethylene layers, an alcohol such as methanol is blocked by the inner polyethylene layer (A), while gasoline diffusing and penetrating through the polyethylene layer is blocked by the intermediate polyamide layer (B) containing a plate-crystal inorganic filler. Thus, this multilayer structure has both the ordinary gasoline blocking property derived from a polyamide and the gasoline blocking effect brought by the orientation of plate crystals and by these synergistic effects, gasoline evaporation can be lowered effectively.

In addition, dispersion of plate-like fine crystal powder such as talc in the polyamide makes it possible to maintain, in a weld between the modified high-density polyethylene and polyamide which weld was not suited for practical use because of a low welding strength, interlayer adhesion strength not only at the initial stage but also after immersion in gasoline. The multilayer fuel valve makes use of the fact that by suppressing the swelling ratio of the talc-containing polyamide layer due to a fuel to a similar level to the swelling ratio of the modified high-density polyethylene due to gasoline or within a shear fracture limit of the material, lowering in strength can be reduced even after contact with gasoline. This makes it possible to provide a fuel part being free from interlayer peeling or cracks which will otherwise be caused by fuel swelling, and having excellent creep resistance, as well as having effects of improving interlayer welding strength between the polyethylene layer and the polyamide layer in a multilayer injection molding and retarding the permeation rate of gasoline by making use of plane orientation of plate-like crystals such as talc. The high-density modified polyethylene is employed here because the resin valve can be welded readily to the fuel tank which is a multilayer blow molding made of high-density polyethylene; and peeling and cracks at the welded part by shearing strain is prevented by suppressing a dimensional change caused by swelling of polyethylene due to contact with gasoline over long years as much as possible.

In Example of the invention which will be described later, the reason for a marked improvement in the T-peel strength of a weld between talc-containing nylon 6 having a high terminal amino group concentration and maleic-acid-modified high-density polyethylene compared with that of a weld between talc-free nylon 6 and maleic-acid-modified high-density polyethylene has not been revealed yet, but it is presumed to owe to some mutual action between talc and maleic-acid-modified high-density polyethylene.

The fuel part is molded or formed by sandwiching molding or the like.

The sandwiching molding can be carried out in a conventional multilayer forming method by pouring a modified high-density polyethylene molten resin in a part of a mold and then, prior to solidification of the resin, pouring a polyamide to the mold as an intermediate layer, thereby completing a filling work. The modified polyethylene is melted by the polyamide molten resin poured at a higher temperature than the modified polyethylene at the interface between the modified polyethylene and the polyamide and the carboxyl group of the modified polyethylene forms a chemical bond with the terminal amino group of the polyamide resin, whereby a firm weld is formed on the interface between these resins.

The fuel parts according to the invention are excellent in fuel permeation resistance and fuel resistance at the weld portion, especially, fuel resistance at the weld portion over years.

The fuel parts produced using a polyamide resin having a plate-crystal inorganic filler incorporated therein are excellent in fuel permeation resistance, have less lowering in interlayer adhesion strength even if brought into contact with gasoline or gasohol at high temperatures, are free from interlayer peeling or cracks and are excellent in creep resistance.

They are therefore suited for use as various parts attached to fuel tanks of automobiles and the like.

The polyamide resin compositions having a layered silicate incorporated therein have high weld strength and barrier properties without losing the properties which crystalline polyamide resins originally have. They can therefore be used for molded or formed products of a large size or a complex shape without depending on a special molder or post processing method.

The present invention will hereinafter be described in detail by Examples and Comparative Examples. It should however be borne in mind that the invention is not limited to or by them.

The physical properties of the molded or formed product in Examples and Comparative Examples were measured as described below.

[Measurement the Terminal Group Concentration of a Polyamide Resin]

The terminal amino group concentration was measured by dissolving 1 g of a polyamide in a phenol.methanol mixed solution, followed by titration with 0.02N hydrochloric acid.

The terminal carboxyl group concentration was measured by dissolving 1 g of a polyamide in benzyl alcohol, followed by titration with a 0.05N sodium hydroxide solution.

[Fuel Permeability Constant]

In accordance with JIS Z0208, fuel permeation of an injection molded test piece of 75 mm in diameter and 1 mm in thickness was tested at an atmospheric temperature upon measurement of 60° C. As a fuel, that obtained by adding 10% of ethanol to Fuel C containing isooctane and toluene at a volumetric ratio of 1:1 was employed. The side of the test piece to be subjected to fuel permeation measurement was disposed with its permeation side down so as to keep it in contact with the fuel.

[Tensile Strength]

In accordance with ASTM D638, tensile test was conducted at a stress rate of 5 mm/min by using a No. 1 test piece of 3.2 mm thick.

[Initial Adhesion Strength]

One test piece having a shape as illustrated in FIG. 1 is available by melt adhesion of the boundary surface between Part 1 and Part 2 upon injection welding.

A metal piece having the shape of Part 2 as illustrated in FIG. 1 was inserted in a mold. Maleic-anhydride-modified polyethylene was then molded into Part 1. Then, sufficiently cooled Part 1 was inserted in the mold and a resin to be evaluated was molded into Part 2, whereby a joined test piece was obtained. Measurement at a stress rate of 50 mm/min was continued until peeling occurred on the boundary surface or fracture (base material fracture) occurred at a position other than the boundary surface and the maximum tensile strength of this test piece was thus obtained. Evaluation was conducted with this maximum tensile strength as the initial adhesion strength.

[Adhesion Strength after Immersion in Fuel]

A test piece molded in a similar manner to that employed for evaluation of the initial adhesion strength was placed in an autoclave and sealed therein until the test piece was completely immersed in a mixed fuel of Fuel C+15% of methanol. The autoclave was then allowed to stand for 350 hours in a hot water tank of 60° C. The maximum point of the tensile strength of the test piece taken out from the autoclave was evaluated as the adhesion strength after immersion in fuel.

EXAMPLE 1

In a 70-liter autoclave, 20 kg of ε-caprolactam as a polymerizable monomer, and 0.5 kg of water and 1/290 (eq/mol lactam) of m-xylylenediamine, each relative to 20 kg of ε-caprolactam were charged. After purging with nitrogen, the autoclave was heated to 100° C. and the mixture was made uniform by stirring. Polymerization was then conducted in the autoclave adjusted to 260° C. and 1.7 MPa. From the resulting polymer, the unreacted monomer was extracted in hot water of 100° C. The resulting polyamide 6 thus obtained as a specimen had a relative viscosity of 2.50 and the terminal amino group concentration of 90 milliequivalent/kg. The pellets thus obtained were injection molded at a cylinder temperature of 270° C. and mold temperature of 80° C. This tensile test specimen in accordance with ASTM was evaluated. In addition, a specimen, which had been obtained by secondary injection molding at a cylinder temperature of 270° C. and a mold temperature of 80° C. as described above in the procedure of FIG. 1 was measured for initial adhesion strength and adhesion strength after immersion in a fuel. Using a plate of 1 mm thickness obtained by molding under similar molding conditions, fuel permeation test was conducted in accordance with JIS Z0208. The results are shown in Table 1.

EXAMPLE 2

In a similar manner to Example 1 except for the use of m-xylylenediamine in an amount of 1/350 (eq/mol lactam), a polyamide 6 was obtained. The resulting polyamide 6 had a terminal amino group concentration of 60 milliequivalent/kg. The pellets were injection molded at a cylinder temperature of 270° C. and a mold temperature of 80° C. and the resulting test piece was evaluated for tensile strength in accordance with ASTM. In addition, a test piece obtained by secondary injection molding at a cylinder temperature of 270° C. and a mold temperature of 80° C. as described above in the procedure of FIG. 1 was measured for initial adhesion strength and adhesion strength after immersion in a fuel. Using a plate of 1 mm thickness molded under similar molding conditions, fuel permeation test was conducted in accordance with JIS Z0208. The results are shown in Table 1.

EXAMPLE 3

In a similar manner to Example 1 except for the use of m-xylylenediamine in an amount of 1/200 (eq/mol lactam), a polyamide 6 was obtained. The resulting polyamide 6 had a terminal amino group concentration of 110 milliequivalent/kg. The pellets were injection molded at a cylinder temperature of 270° C. and a mold temperature of 80° C. and the resulting test piece was evaluated for tensile strength in accordance with ASTM. In addition, a test piece obtained by secondary injection molding at a cylinder temperature of 270° C. and a mold temperature of 80° C. as described above in the procedure of FIG. 1 was measured for initial adhesion strength and adhesion strength after immersion in a fuel. Using a plate of 1 mm thickness molded under similar molding conditions, fuel permeation test was conducted in accordance with JIS Z0208. The results are shown in Table 1.

EXAMPLE 4

In a 70-liter autoclave, 20 kg of laurolactam as a polymerizable monomer, and 4 kg of water and 1/300 (eq/mol leurolactam) of m-xylylenediamine, each relative to 20 kg of laurolactam, were charged. After purging with nitrogen, the autoclave was heated to 180° C. and the mixture was made uniform by stirring. Pre-polymerization was conducted in the autoclave set at 280° C. and 3.0 MPa. The temperature was then lowered to 250° C. while releasing pressure to atmospheric pressure. Post polymerization was conducted at 250° C. in a nitrogen gas stream. A polyamide 12 thus obtained had a relative viscosity of 2.05 and the terminal amino group concentration of 60 milliequivalent/kg. The pellets thus obtained were injection molded at a cylinder temperature of 270° C. and a mold temperature of 80° C. This tensile test specimen in accordance with ASTM was evaluated. In addition, a test piece obtained by secondary injection molding at a cylinder temperature of 270° C. and a mold temperature of 80° C. as described above in the procedure of FIG. 1 was measured for initial adhesion strength and adhesion strength after immersion in a fuel. Using a plate of 1 mm thickness obtained by molding under similar molding conditions, fuel permeation test was conducted in accordance with JIS Z0208. The results are shown in Table 1.

EXAMPLE 5

In a similar manner to Example 4 except for the use of m-xylylenediamine in an amount of 1/480 (eq/mol laurolactam), a polyamide 12 was obtained. The resulting polyamide 12 had a terminal amino group concentration of 50 milliequivalent/kg. The pellets were injection molded at a cylinder temperature of 270° C. and a mold temperature of 80° C. and the resulting test piece was evaluated for tensile strength in accordance with ASTM. In addition, a test piece obtained by secondary injection molding at a cylinder temperature of 270° C. and a mold temperature of 80° C. as described above in the procedure of FIG. 1 was measured for initial adhesion strength and adhesion strength after immersion in a fuel. Using a plate of 1 mm thickness molded under similar molding conditions, fuel permeation test was conducted in accordance with JIS Z0208. The results are shown in Table 1.

EXAMPLE 6

In a similar manner to Example 4 except for the use of m-xylylenediamine in an amount of 1/250 (eq/mol laurolactam), a polyamide 12 was obtained. The resulting polyamide 12 had a terminal amino group concentration of 80 milliequivalent/kg. The pellets were injection molded at a cylinder temperature of 270° C. and a mold temperature of 80° C. and the resulting test piece was evaluated for tensile strength in accordance with ASTM. In addition, a test piece obtained by secondary injection molding at a cylinder temperature of 270° C. and a mold temperature of 80° C. as described above in the procedure of FIG. 1 was measured for initial adhesion strength and adhesion strength after immersion in a fuel. Using a plate of 1 mm thickness molded under similar molding conditions, fuel permeation test was conducted in accordance with JIS Z0208. The results are shown in Table 1.

COMPARATIVE EXAMPLE 1

In a similar manner to Example 1 except for the use of m-xylylenediamine in an amount of 1/400 (eq/mol lactam), a polyamide 6 was obtained. The resulting polyamide 6 had a terminal amino group concentration of 50 milliequivalent/kg. The pellets were injection molded at a cylinder temperature of 270° C. and a mold temperature of 80° C. and the test piece thus obtained was evaluated for tensile strength in accordance with ASTM. In addition, the test piece obtained by secondary injection molding at a cylinder temperature set at 270° C. and a mold temperature of 80° C. as described above in the procedure of FIG. 1 was measured for initial adhesion strength and adhesion strength after immersion in a fuel. Using a plate of 1 mm thickness molded under similar molding conditions, fuel permeation test was conducted in accordance with JIS Z0208. The results are shown in Table 1.

COMPARATIVE EXAMPLE 2

In a similar manner to Example 4 except for the use of m-xylylenediamine in an amount of 1/3000 (eq/mol leurolactam), a polyamide 12 was obtained. The resulting polyamide 12 had a terminal amino group concentration of 40 milliequivalent/kg. The pellets were injection molded at a cylinder temperature of 270° C. and a mold temperature of 80° C. and the resulting test piece was evaluated for tensile strength in accordance with ASTM. In addition, the test piece obtained by secondary injection molding at a cylinder temperature of 270° C. and a mold temperature of 80° C. as described above in the procedure of FIG. 1 was measured for initial adhesion strength and adhesion strength after immersion in a fuel. Using a plate of 1 mm thickness molded under similar molding conditions, fuel permeation test was conducted in accordance with JIS Z0208. The results are shown in Table 1.

COMPARATIVE EXAMPLE 3

Polyethylene modified with maleic anhydride was injection molded at a cylinder temperature of 190° C. and a mold temperature of 40° C. and the test piece was evaluated for tensile strength in accordance with ASTM. Using a plate of 1 mm thickness molded under similar molding conditions, fuel permeation test was conducted in accordance with JIS Z0208. The results are shown in Table 1.

TABLE 1

|  | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|
| Resin used | PA6 | PA6 | PA6 | PA12 | PA12 | PA12 | PA6 | PA12 | Modified PE |
| Terminal amino group concentration (mg eq) | 90 | 60 | 110 | 60 | 50 | 80 | 50 | 40 | — |
| Terminal carboxyl group concentration (mg eq) | 20 | 50 | 10 | 20 | 30 | 10 | 65 | 50 |  |
| Fuel permeability constant E10 (60° C.) (g · mm/m$^2$ · 24 hr) | 9 | 9 | 10 | 98 | 102 | 95 | 9 | 95 | 1030 |
| Tensile strength (MPa) | 71 | 72 | 71 | 43 | 43 | 44 | 72 | 43 | 13 |

TABLE 1-continued

|  | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|
| Adhesion molding temperature (° C.) | 270 | 270 | 270 | 270 | 270 | 270 | 270 | 270 | — |
| Initial adhesion strength (MPa) | 13 | 13 | 13 | 13 | 13 | 13 | 13 | 13 | — |
| Adhesion strength after immersion in fuel (MPa) | 12 | 11 | 13 | 12 | 12 | 13 | 3 | 4 | — |

The followings are Examples wherein a polyamide resin having a plate-crystal inorganic filler incorporated therein was used.

[Polyamide Resins Employed]

Polyamide 6A: Nylon 6, "1013A", trade name; product of Ube Industries, Ltd., having a terminal amino group concentration of 97 milliequivalent/kg and a terminal carboxyl group concentration of 25 milliequivalent/kg Polyamide 6B: Nylon 6, "1013B", trade name; product of Ube Industries, Ltd., having a terminal amino group concentration of 46 milliequivalent/kg and a terminal carboxyl group concentration of 65 milliequivalent/kg. [Modified High-density Polyethylene Employed]

Maleic-acid-modified high-density polyethylene having a density of 0.95 g/cm$^3$ and a maleic anhydride concentration of 19.2 milliequivalent/kg: "ER403A", product of Japan Polyolefins Co., Ltd.,

[Sample Preparation and Testing Method]

Talc-containing polyamide 6 resin: By using a twin-screw kneader ("TEX30XSST", trade name; manufactured by Japan Steel Works) under conditions of a kneading temperature of 250° C., screw rotation at 250 rpm and a screw of two strands and L/D=40, components were fed to a supply port by using a weigh-feeder so as to prepare a material having a predetermined composition. The strands were water-cooled, whereby talc-containing polyamide was obtained in the form of pellets. These pellets were vacuum dried at 80° C. for 48 hours.

Glass-fiber-containing polyamide 6 resin: A twin-screw kneader ("TEX30XSST", manufactured by Japan Steel Works) was used under conditions of a kneading temperature of 250° C., screw rotation at 200 rpm and a screw of two strands and L/D=40. A predetermined amount of polyamide was fed to a hopper supply port by using a weigh-feeder, and glass fibers ("03T275H", trade name; product of Nippon Electric Glass; cut length: 10 mm, fiber diameter: 10 μm) was charged by a side feeder. The strands were water-cooled, whereby a glass-fiber-containing polyamide was obtained in the pellet form. The polyamide was then vacuum dried at 80° C. for 48 hours.

Tensile test of ASTM Type 1 dumbbell specimen: in accordance with ASTM D882-91

T-peel strength sample and measurement: By using a mold of 70 mm×70 mm×3 mm at a mold temperature of 40° C., a maleic-acid-modified high-density polyethylene was injection molded at 230° C. Then, a polyimide adhesive film of 30 mm×70 mm was adhered to the end of the resulting modified high-density polyethylene piece in order to provide it with a tong hold for the chuck for tensile test, followed by insertion in a mold of 70 mm×70 mm×5 mm (mold temperature: 80° C.) with the adhesive film coming on the gate side of the mold and at the same time, on the welded side. The polyamide 6 resin or talc-containing polyamide 6 resin was then injected at 300° C. In the test piece thus obtained, the polyethylene layer had a thickness of 3 mm and the polyamide layer had a thickness of 2 mm and they were welded on their interfaces. It was cut in parallel in the injecting direction at intervals of 10 mm and the polyimide film portion was opened as the tong hold for the chuck of a tensile tester, whereby a T-peel test piece was obtained. The T-peel strength was measured at a rate of 20 mm/min. Immersion in fuel: In a stainless pressure vessel, a test piece was immersed in synthetic gasoline (Fuel C) or methanol-containing synthetic gasoline at 60° C. for 2 weeks and it was provided immediately as a test piece for tensile test or T-peel test.

Immersion conditions 1: immersion in Fuel C at 60° C. for 2 weeks

Immersion conditions 2: immersion in methanol-containing gasoline at 60° C. for 2 weeks wherein, Fuel C was a mixture of 50 vol. % of toluene+50 vol. % of isooctane, while methanol-containing gasoline was a mixture of 85 vol. % of Fuel C +15 vol. % of methanol.

EXAMPLE 7

Maleic-acid-modified high-density polyethylene ("ER403A", trade name; product of Japan Polyolefins) was injected in an ASTM Type 1 dumbbell mold at a mold temperature of 40° C. and cylinder temperature of 230° C. The modified polyethylene in the form of Type 1 dumbbell was cut at its center and inserted in the mold on the side opposite to the gate of the mold heated to the mold temperature of 80° C. Talc-containing nylon obtained by mixing 90 wt. % of Polyamide 6A ("1013A", trade name; product of Ube Industries, Ltd.) and 10 wt. % of talc powder ("LSM350", trade name; product of Fuji Talc Industry, having an average particle size of 4.2 μm) in a twin-screw kneader was then injected at a temperature of 300° C. to yield butt-welded ASTM Type 1 dumbbell specimens each having both resins welded at the center. Tensile test of the specimen before treatment and those after treatment under Immersion conditions 1 and 2, respectively was conducted and the welding strength was determined. It was found that the initial strength was 85.7 MPa, and the strength after treatment under Immersion conditions 1 was 76 MPa and that under Immersion conditions 2 was 25.5 MPa.

EXAMPLE 8

In a similar manner to Example 7 except the talc-containing polyamide was obtained by mixing 80 wt. % of Polyamide 6A and 20 wt. % of the talc powder, specimens were prepared and their initial weld strength and weld strength after immersion were determined. It was found that the initial weld strength was 91.3 MPa, and the strength after treatment under Immersion conditions 1 was 76.5 MPa and that under Immersion conditions 2 was 37.4 MPa.

REFERENTIAL EXAMPLE 1

In a similar manner to Example 7 except for the use of only Polyamide 6A instead of the talc-containing nylon, specimens were prepared and their initial weld strength and weld strength after immersion were determined. It was found that the initial strength was 84.3 MPa, and the strength after treatment under Immersion conditions 1 was 56.1 MPa and that under Immersion conditions 2 was lowered to 11.8 MPa.

REFERENTIAL EXAMPLE 2

In a similar manner to Example 7 except that a polyamide obtained by twin-screw kneading of 10 wt. % of fine calcium carbonate powder in the anisotropy-free spherical form ("StaVigot 15A", trade name; product of Shiraishi Calcium, having an average particle size of 0.15 μm), which was used instead of plate-crystal talc, and 90 wt. % of Polyamide 6A, specimens were prepared and their initial weld strength and weld strength after immersion were determined. It was found that the initial strength was 80.2 MPa, and the strength after treatment under Immersion conditions 1 was 51.5 MPa and that under Immersion conditions 2 was lowered to 18.8 MPa.

REFERENTIAL EXAMPLE 3

In a similar manner to Referential Example 2 except for the use of 20 wt. % of fine calcium carbonate powder and 80 wt. % of Polyamide 6A, specimens were prepared and their initial weld strength and weld strength after immersion were determined. It was found that the initial strength was 81.4 MPa, and the strength after treatment under Immersion conditions 1 was 66.4 MPa and that under Immersion conditions 2 was lowered to 16.7 MPa.

COMPARATIVE EXAMPLE 4

In a similar manner to Example 7 except that Polyamide 6B was used instead and talc was not added, specimens were prepared and their initial weld strength and weld strength after immersion were determined. It was found that the initial strength was 81.3 MPa, and the strength after treatment under Immersion conditions 1 was 7.7 MPa and that under Immersion conditions 2 was lowered to 2.5 MPa.

Results of Examples 7 and 8, Referential Examples 1 to 3 and Comparative Example 4 are shown in Table 2.

EXAMPLE 9

Using a talc-containing polyamide containing 80 wt. % of Polyamide 6A and 20 wt. % of talc powder, a T-peel test piece was prepared and interlayer weld strength between the maleic-anhydride-modified high-density polyethylene and the polyamide was evaluated. Since the inner layer of the fuel part employed here is made of acid-modified high-density polyethylene so that upon practical use, methanol or the like in gasohol does not reach the polyamide layer easily, blocked by the inner polyethylene layer. Lowering in weld strength due to a fuel was therefore evaluated under Immersion conditions 1 using methanol-free Fuel C. The results are shown in Table 3. The specimen made of the talc (20 wt. %)-containing polyamide and maleic-acid-modified high-density polyethylene had markedly increased T-peel strength as compared with that using the polyamide free of talc and it hardly exhibited lowering in strength even after immersion in Fuel C.

REFERENTIAL EXAMPLE 4

In a similar manner to Example 9 except that Polyamide 6A was used but talc was not added, specimens were prepared and they were evaluated for interlayer weld strength. The results are shown in Table 3. It has been found that the T-peel strength of the specimen made of talc-free Polyamide 6A and maleic-acid-modified high-density polyethylene was low both at the initial stage and after treatment under Immersion conditions 1.

REFERENTIAL EXAMPLE 5

In a similar manner to Example 9 except for the use of 70 wt. % of Polyamide 6A and 30 wt. % of talc powder, specimens were prepared and they were evaluated for interlayer weld strength. The results are shown in Table 3.

EXAMPLES 10 TO 11 AND REFERENTIAL EXAMPLES 6 TO 7

Injection molding of each of a glass-fiber-containing polyamide resin and a talc-containing polyamide resin at 250° C. by using a film-gate system mold having a cavity of 100×100×2 mm and having the mold temperature at 80° C. yielded a plate. The plate was immersed for 2 weeks in a fuel mixture of 60° C. containing Fuel C and 15 vol. % of methanol. The plate was then cut into a piece of 10 cm wide both in the injection direction and a direction perpendicular thereto and provided as a specimen for tensile test. The tensile test was conducted in accordance with ASTM D882-91. The results are shown in Table 4.

When an elastic modulus before immersion in the synthetic fuel was compared, the anisotropy of the molded product of the glass-fiber-containing polyamide having a filler content of 20 or 30% was large between the injection direction and a direction perpendicular thereto, while the talc-containing polyamide molded product having a filler content of 20 or 30% hardly exhibited anisotropy. When a change in the elastic modulus after immersion in the fuel was compared, on the other hand, the anisotropy of the molded product of the glass-fiber-containing polyamide between the injection direction and the direction perpendicular thereto showed a further expansion and a drop in the elastic modulus was severe particularly in the non-reinforced direction, that is, the direction perpendicular to the injection direction.

Almost no anisotropy was observed, even after immersion in fuel, in the elastic modulus of the talc-containing polyamide resin molded product containing 20 or 30% of talc. Comparison in the elastic modulus in the direction perpendicular to the injection direction at the same filler amount revealed that the talc-containing polyamide resin molded product was higher than the glass-fiber-containing polyamide molded product.

The above test results indicate that glass-fiber-containing nylon resin molded products easily change their shape when immersed in a fuel and exposed to an external stress in the direction perpendicular to the injection direction. The elastic modulus of the talc-containing nylon resin molded products are, on the other hand, maintained almost free of anisotropy, and are kept higher than that of the glass-fiber-containing molded products in the direction perpendicular to the injection direction.

The nylon resin molded product containing glass fibers, which are fibrous materials, cannot be free from creep phenomenon caused by anisotropy of its mechanical properties and expansion of anisotropy of elastic modulus due to immersion in fuel. The talc-containing nylon resin molded product containing plate-crystal talc is, on the other hand, almost free from anisotropy of mechanical properties even after immersion in fuel and in addition, the elastic modulus in the direction perpendicular to the injection direction is greater than that of the glass-fiber-containing product. This suggests that the talc-containing nylon resin does not easily cause a deformation in a specific direction and has high creep resistance.

TABLE 2

|  | Ex. 7 | Ex. 8 | Ref. Ex. 1 | Ref. Ex. 2 | Ref. Ex. 3 | Comp. Ex. 4 |
|---|---|---|---|---|---|---|
| PA resin | 6A | 6A | 6A | 6A | 6A | 6B |
| Amount of PA resin (wt. %) | 90 | 80 | 100 | 90 | 80 | 100 |
| Talc content (wt. %) | 10 | 20 |  |  |  |  |
| Calcium carbonate content (wt. %) |  |  |  | 10 | 20 |  |
| Initial weld tensile strength (MPa) | 85.7 | 91.3 | 84.3 | 80.2 | 81.4 | 81.3 |
| Weld tensile strength after Immersion Conditions 1 (MPa) | 76.0 | 76.5 | 56.1 | 51.5 | 66.4 | 7.7 |
| Weld tensile strength after Immersion Conditions 2 (MPa) | 25.5 | 37.4 | 11.8 | 18.8 | 16.7 | 2.5 |

TABLE 3

|  | Ex. 9 | Ref. Ex. 4 | Ref. Ex. 5 |
|---|---|---|---|
| PA resin | 6A | 6A | 6A |
| Amount of PA resin (wt. %) | 80 | 100 | 70 |
| Talc content (wt. %) | 20 | 0 | 30 |
| Initial T-peel strength (Kg/10 mm) | 31.0 | 9.5 | 11.7 |
| T-peel strength after treatment under Immersion conditions 1 (Kg/10 mm) | 26.9 | 4.9 | 4.9 |

TABLE 4

|  | Ex. 10 | Ex. 11 | Ref. Ex. 6 | Ref. Ex. 7 |
|---|---|---|---|---|
| PA resin | 6A | 6A | 6A | 6A |
| Amount of PA resin (wt. %) | 80 | 70 | 80 | 70 |
| Talc content (wt. %) | 20 | 30 |  |  |
| Glass fiber content (wt. %) |  |  | 20 | 30 |
| Initial modulus in tension (GPa) |  |  |  |  |
| Injection flow direction | 3.65 | 4.47 | 4.04 | 4.94 |
| Direction perpendicular to injection flow | 3.52 | 4.34 | 2.98 | 3.30 |

TABLE 4-continued

|  | Ex. 10 | Ex. 11 | Ref. Ex. 6 | Ref. Ex. 7 |
|---|---|---|---|---|
| Modulus in tension after immersion (GPa) |  |  |  |  |
| Injection flow direction | 0.91 | 1.22 | 1.66 | 2.29 |
| Direction perpendicular to injection flow | 0.89 | 1.17 | 0.79 | 0.94 |

EXAMPLE 12

In 10 liter of water was dispersed 100 g of montmorillonite having an average thickness of 9.5 Å as one unit of a layered silicate and an average side length of about 0.1 µm, followed by the addition of 51.2 g of 12-aminododecanoic acid and 24 ml of concentrated hydrochloric acid. After dispersion for 5 minutes and filtration, washing was conducted sufficiently, followed by vacuum drying. By this operation, a complex of ammonium 12-aminododecanoate ions and montmorillonite was prepared. The complex was found to have a layered silicate content of 80 wt. %. As a result of measurement by X-ray diffraction of this complex, the interlayer distance of the layered silicate was found to be 18.0 Å.

In a 70-liter autoclave, 20 kg of ε-caprolactam was charged as a polymerizable monomer, and 0.5 kg of water, 200 g of the complex, and 1/290 (eq/mol lactam) of m-xylylenediamine, each relative to 20 kg of ε-caprolactam were charged. After purging with nitrogen, the autoclave was heated to 100° C. The mixture was made uniform by stirring in the autoclave, followed by stirring at 160° C. and 1.7 MPa for 1 hour. The pressure was then released and polymerization was conducted under normal pressure for 3 hours, while evaporating water from the reaction vessel. After completion of the reaction, the polymer taken out in the strand form from the lower nozzle of the reaction vessel was cooled and cut into pellets made of the polyamide resin and montmorillonite. From the pellets, the unreacted monomer was extracted in hot water of 100° C. and the residue was vacuum dried, whereby a specimen was prepared. As a result of X-ray diffraction, it was found to have an interlayer distance of 100 Å or greater.

The polyamide 6 thus obtained had a relative viscosity of 2.50 and a terminal amino group concentration of 90 milliequivalent/kg. The resulting pellets were injection molded at a cylinder temperature of 270° C. and a mold temperature of 80° C. and this tensile test specimen in accordance with ASTM was evaluated. In addition, a specimen, which had been obtained by secondary injection molding at a cylinder temperature of 270° C. and a mold temperature of 80° C. as described above in the procedure of FIG. 1, was measured for initial adhesion strength and adhesion strength after immersion in a fuel. Using a plate of 1 mm thick obtained by molding under similar molding conditions, fuel permeation test was conducted in accordance with JIS Z0208. The results are shown in Table 5.

EXAMPLE 13

In a similar manner to Example 12 except for the use of m-xylylenediamine in an amount of 1/350 (eq/mol lactam), a polyamide 6 was obtained. The resulting polyamide 6 had a terminal amino group concentration of 60 milliequivalent/ kg. The pellets were injection molded at a cylinder temperature of 270° C. and a mold temperature of 80° C. and this tensile test specimen in accordance with ASTM was evaluated. In addition, a specimen, which had been obtained by secondary injection molding at a cylinder temperature of 270° C. and a mold temperature of 80° C. as described above in the procedure of FIG. 1 was measured for initial adhesion strength and adhesion strength after immersion in a fuel. Using a plate of 1 mm thick molded under similar molding conditions, fuel permeation test was conducted in accordance with JIS Z0208. The results are shown in Table 5.

EXAMPLE 14

In a similar manner to Example 12 except for the use of m-xylylenediamine in an amount of 1/200 (eq/mol lactam), a polyamide 6 was obtained. The resulting polyamide 6 had a terminal amino group concentration of 110 milliequivalent/kg. The pellets were injection molded at a cylinder temperature of 270° C. and a mold temperature of 80° C. and this tensile test specimen in accordance with ASTM was evaluated. In addition, a specimen, which had been obtained by secondary injection molding at a cylinder temperature of 270° C. and a mold temperature of 80° C. as described above in the procedure of FIG. 1 was measured for initial adhesion strength and adhesion strength after immersion in a fuel. Using a plate of 1 mm thick molded under similar molding conditions, fuel permeation test was conducted in accordance with JIS Z0208. The results are shown in Table 5.

EXAMPLE 15

In a similar manner to Example 12 except that the montmorillonite complex was used in an amount of 500 g, a polyamide 6 was obtained. As a result of measurement by X-ray diffraction, the resulting material had an interlayer distance of 100 Å or greater. The pellets were injection molded at a cylinder temperature of 270° C. and a mold temperature of 80° C. and this tensile test specimen in accordance with ASTM was evaluated. In addition, a specimen, which had been obtained by secondary injection molding at a cylinder temperature of 270° C. and a mold temperature of 80° C. as described above in the procedure of FIG. 1 was measured for initial adhesion strength and adhesion strength after immersion in a fuel. Using a plate of 1 mm thick molded under similar molding conditions, fuel permeation test was conducted in accordance with JIS Z0208. The results are shown in Table 5.

EXAMPLE 16

In a 70-liter autoclave, 20 kg of ω-laurolactam was charged as a polymerizable monomer, and 4 kg of water, 200 g of the montmorillonite complex, and 1/300 (eq/mol lactam) of m-xylylenediamine, each relative to 20 kg of ω-laurolactam were charged. After purging with nitrogen, the autoclave was heated to 180° C. and the mixture was made uniform by stirring. Pre-polymerization was then conducted at 280° C. and 3.0 MPa. The temperature in the autoclave was lowered to 250° C. while releasing the pressure to atmospheric pressure. At 250° C., post-polymerization was conducted in a nitrogen gas stream. After completion of the reaction, the polymer taken out in the form of strands from the lower nozzle of the reaction vessel was cooled and cut into pellets made of the polyamide resin and montmorillonite. From the pellets, the unreacted monomer was extracted in hot water of 100° C. and the residue was vacuum dried, whereby a specimen was prepared. As a result of measurement by X-ray diffraction, it was found to have an interlayer distance of 100 Å or greater.

The polyamide 12 thus obtained had a relative viscosity of 2.05 and terminal amino group concentration of 60 milliequivalent/kg. The resulting pellets were injection molded at a cylinder temperature of 270° C. and a mold temperature of 80° C. and this tensile test specimen in accordance with ASTM was evaluated. In addition, a specimen, which had been obtained by secondary injection molding at a cylinder temperature of 270° C. and a mold temperature of 80° C. as described above in the procedure of FIG. 1 was measured for initial adhesion strength and adhesion strength after immersion in a fuel. Using a plate of 1 mm thick obtained by molding under similar molding conditions, fuel permeation test was conducted in accordance with JIS Z0208. The results are shown in Table 5.

EXAMPLE 17

In a similar manner to Example 16 except for the use of m-xylylenediamine in an amount of 1/480 (eq/mol lactam), a polyamide 12 was obtained. The resulting polyamide 12 had a terminal amino group concentration of 50 milliequivalent/kg. The pellets were injection molded at a cylinder temperature of 270° C. and a mold temperature of 80° C. and this tensile test piece in accordance with ASTM was evaluated. In addition, a specimen, which had been obtained by secondary injection molding at a cylinder temperature of 270° C. and a mold temperature of 80° C. as described above in the procedure of FIG. 1 was measured for initial adhesion strength and adhesion strength after immersion in a fuel. Using a plate of 1 mm thick molded under similar molding conditions, fuel permeation test was conducted in accordance with JIS Z0208. The results are shown in Table 5.

EXAMPLE 18

In a similar manner to Example 16 except for the use of m-xylylenediamine in an amount of 1/250 (eq/mol lactam), a polyamide 12 was obtained. The resulting polyamide 12 had a terminal amino group concentration of 80 milliequivalent/kg. The pellets were injection molded at a cylinder temperature of 270° C. and a mold temperature of 80° C. and this tensile test specimen in accordance with ASTM was evaluated. In addition, a specimen, which had been obtained by secondary injection molding at a cylinder temperature of 270° C. and a mold temperature of 80° C. as described above in the procedure of FIG. 1 was measured for initial adhesion strength and adhesion strength after immersion in a fuel. Using a plate of 1 mm thick molded under similar molding conditions, fuel permeation test was conducted in accordance with JIS Z0208. The results are shown in Table 5.

COMPARATIVE EXAMPLE 5

In a similar manner to Example 12 except for the use of m-xylylenediamine in an amount of 1/400 (eq/mol lactam), a polyamide 6 was obtained. The resulting polyamide 6 had a terminal amino group concentration of 50 milliequivalent/kg. The pellets were injection molded at a cylinder temperature of 270° C. and a mold temperature of 80° C. and a tensile test piece in accordance with ASTM was evaluated. In addition, a specimen, which had been obtained by secondary injection molding at a cylinder temperature of 270° C. and a mold temperature of 80° C. as described above in the procedure of FIG. 1 was measured for initial adhesion strength and adhesion strength after immersion in a fuel. Using a plate of 1 mm thick molded under similar molding conditions, fuel permeation test was conducted in accordance with JIS Z0208. The results are shown in Table 5.

TABLE 5

|  | Ex. 12 | Ex. 13 | Ex. 14 | Ex. 15 | Ex. 16 | Ex. 17 | Ex. 18 | Comp. Ex. 5 |
|---|---|---|---|---|---|---|---|---|
| Resin prepared | PA6 | PA6 | PA6 | PA6 | PA12 | PA12 | PA12 | PA6 |
| Terminal amino Concentration (mg equivalent) | 90 | 60 | 110 | 90 | 60 | 50 | 80 | 50 |
| Terminal carboxyl Concentration (mg equivalent) | 20 | 50 | 10 | 20 | 20 | 30 | 10 | 65 |
| Clay amount (%) | 2 | 2 | 2 | 5 | 2 | 2 | 2 | 2 |
| Interlayer distance of montmorillonite (Å) | >100 | >100 | >100 | >100 | >100 | >100 | >100 | >100 |
| Fuel permeability constant (E10 60° C.) (g · mm/m$^2$ · 24 hr) | 3 | 3 | 3 | 1 | 50 | 50 | 50 | 3 |
| Tensile strength | 83 | 83 | 82 | 93 | 51 | 52 | 51 | 82 |
| Adhesion molding temperature | 270 | 270 | 270 | 270 | 270 | 270 | 270 | 270 |
| Initial adhesion strength | 15 | 13 | 14 | 14 | 12 | 13 | 13 | 7 |
| Adhesion strength after immersion in fuel | 13 | 11 | 13 | 13 | 11 | 11 | 12 | 0.5 |

While the invention has been described in detail and with reference to specific embodiments thereof, it will be apparent to one skilled in the art that various changes and modifications can be made therein without departing from the spirit and scope thereof.

What is claimed is:

1. A fuel part comprising a crystalline polyamide resin having a terminal amino group concentration greater than a terminal carboxyl group concentration, wherein the fuel part is attached by a welding portion to at least one selected from the group consisting of a fuel tank, a fuel hose, and a fuel canister, and has excellent fuel resistance at the welding portion.

2. The fuel part according to claim 1, wherein a terminal amino group concentration is at least 50 milliequivalent per kg of the resin.

3. The fuel part according to claim 1, wherein the crystalline polyamide resin is an aliphatic polyamide resin comprising an aliphatic diamine and an aliphatic dicarboxylic acid, a lactam, or an aminocarboxylic acid.

4. The fuel part according to claim 1, wherein the crystalline polyamide resin is a crystalline semi-aromatic polyamide resin comprising at least one aromatic monomer component.

5. The fuel part according to claim 1, wherein the polyamide resin contains 3 to 27 wt. % of a plate-crystal inorganic filler.

6. The fuel part according to claim 5, wherein the part has a multilayer structure comprising an inner layer (A) comprising high-density polyethylene modified with an unsaturated carboxylic acid or a derivative thereof; and an outer layer (B) comprising the crystalline polyamide resin.

7. The fuel part according to claim 5, wherein the part has a multilayer structure comprising an inner layer (A) and an outer layer (C) comprising high-density polyethylene modified with an unsaturated carboxylic acid or a derivative thereof; and an intermediate layer (B) comprising the crystalline polyamide resin.

8. The fuel part according to claim 6, wherein the modified high-density polyethylene has a density of 0.935 to 0.955 g/cm$^3$.

9. The fuel part according to claim 6, wherein the plate-crystal inorganic filler is fine talc powder or fine mica powder.

10. The fuel part according to claim 6, wherein the fuel part is a valve cover and is attached to a fuel tank, further comprising a pipe portion for bonding a tube for fluid to the tank and an end portion for welding the pipe portion to the tank.

11. The fuel part according to claim 10, wherein the end portion comprises a flange.

12. A fuel part comprising a first portion comprising a crystalline polyamide resin having a terminal amino group concentration greater than a terminal carboxyl group concentration and a second portion comprising a polyolefin resin modified with an unsaturated carboxylic acid or a derivative thereof; wherein the fuel part is attached to at least one selected from the group consisting of a fuel tank, a fuel hose, and a fuel canister and has excellent fuel resistance at a weld portion between the first and the second portions.

13. A fuel part comprising a polyamide resin composition comprising (A) 100 parts by weight of a crystalline polyamide resin having a terminal amino group concentration greater than a terminal carboxyl group concentration, and (B) 0.05 to 10 parts by weight of layered silicates uniformly dispersed in the polyamide resin, wherein the fuel part is attached to at least one selected from the group consisting of a fuel tank, a fuel hose, and a fuel canister and has excellent fuel resistance at a weld portion thereof.

14. The fuel part according to claim 12, wherein the part is a resin valve cover welded to an outer layer of a resin fuel tank to seal a valve-mounting slot formed in the tank, the valve cover has a cylindrical shape having one end closed with a pipe hole for delivering a fuel; and wherein an inside portion of the cylinder to be brought into contact with the fuel comprises the crystalline polyamide resin and an outer portion of the cylinder not brought into contact with the fuel comprises the polyolefin resin.

15. The fuel part according to claim 14, further comprising a pipe tube having a hollow hole communicated to the pipe hole, wherein the pipe tube comprises the crystalline polyamide resin and a cyclic concave in a vicinity of a root of the pipe for engagement with the polyolefin resin.

16. The fuel part according to claim 14, further comprising a first plurality of convexities or holes on a member comprising the polyamide resin and a second plurality of holes or convexities to be fitted in the first plurality of convexities or holes on a member comprising the polyolefin resin.

17. The fuel part according to claim 14, further comprising a first plurality of convexities or holes on a member comprising the polyamide resin and a second plurality of holes or convexities to be fitted in the first plurality of convexities or holes on a member comprising the polyolefin resin.

18. The fuel part according to claim 12, wherein the part is a resin valve cover welded to an outer layer of a resin fuel tank to seal a valve-mounting slot formed in the tank, the valve cover has a cylindrical shape having one end closed with a pipe hole for delivering a fuel; and wherein an inside portion of the cylinder to be brought into contact with the fuel comprises the polyolefin resin and an outer portion of the cylinder not brought into contact with the fuel comprises the crystalline polyamide resin.

19. The fuel part according to claim 18, further comprising a pipe tube having a hollow hole communicated to the pipe hole, wherein the pipe tube comprises the polyolefin resin and a cyclic concavity in a vicinity of a root of the pipe for engagement with the crystalline polyamide resin.

20. The fuel part according to claim 13, further comprising a polyolefin resin modified with an unsaturated carboxylic acid or a derivative thereof welded to the polyamide resin composition.

* * * * *